United States Patent [19]
Breen et al.

[11] Patent Number: 4,817,310
[45] Date of Patent: Apr. 4, 1989

[54] THERMALLY IMPRINTABLE BAGGAGE TAG OF PAPER

[75] Inventors: Thomas J. Breen, Northbrook; Stephen H. King, Schaumburg, both of Ill.

[73] Assignee: Rand McNally & Company, Skokie, Ill.

[21] Appl. No.: 131,941

[22] Filed: Dec. 11, 1987

[51] Int. Cl.⁴ .............................................. G09F 3/100
[52] U.S. Cl. ..................................................... 40/299
[58] Field of Search ...................... 40/6, 633, 655, 615, 40/299; 283/80; 428/354, 113

[56] References Cited

U.S. PATENT DOCUMENTS 3,808,718  5/1974  Christiansen ........................... 40/299
4,630,384 12/1986  Breen ..................................... 40/665
4,666,185  5/1987  Pilborough ............................. 283/80

Primary Examiner—Robert P. Swiatek
Assistant Examiner—Cary E. Stone
Attorney, Agent, or Firm—Dressler, Goldsmith, Shore, Sutker & Milnamow, Ltd.

[57] ABSTRACT

A thermally imprintable baggage tag assembly formed of a laminate comprising highly calendered, dense bond paper sheet, an inexpensive paper sheet and reinforcing fibers sandwiched therebetween and running in the longitudinal direction only. A thermally imprintable layer is disposed on the bond paper side of the laminate and a liner is adhesively secured to the other side. The laminate and liner are scored in longitudinally spaced locations and are provided with bands of release material so that when tag and claim check portions are severed along the score lines, the tag and claim check portions will each have exposed zones of adhesive for securance to other objects or zones as desired.

6 Claims, 1 Drawing Sheet

THERMALLY IMPRINTABLE BAGGAGE TAG OF PAPER

BACKGROUND OF THE INVENTION

This invention relates to disposable identification tags for temporary attachment to pieces of baggage, and in particular to a unique, thermally imprintable paper product baggage tag.

Disposable baggage tags are widely used by airlines, railroads and the like. Untold numbers of them are used daily. Because they are used on a temporary basis only, and so widely used, the cost of baggage tags is an important factor in their acceptability to mass-user customers. The cost of the tags, as well as the ease of attachment and use of baggage tags and their resistance to tearing and inadvertent removal during the baggage handling process are other important considerations.

Generally speaking, the baggage tags under consideration include two portions, the baggage tag portion and the claim check or stub portion, most frequently severable into those portions along score lines. The overall tags are usually elongate, rectangular strips of flexible material which may be of paper or other types of film material.

A wide variety of baggage tags are currently in use. Among others are those described in U.S. Pat. No. 4,630,384 which describes a self-locking baggage tag made of an elongated reinforced paper product tape strip having parallel rows of reinforcing fibers therein and disposed between typical kraft paper layers, such as brown or white (bleached) kraft paper.

Such tags may be imprinted with conventional identifying material, such as the airline, the tags may then be "customized" by inscribing information by hand in appropriate locations, such as information specific to the flight, and other selected or desired information.

Other types of baggage tags which are currently available include those which have a heat sensitive coating, and which are therefore thermally imprintable, and which may be dispensed from a device which locally heats the baggage tag to provide the "customized" identifying data, such as the flight, the passenger's name, the date, etc. Such tags require a very smooth surface upon which the coating is applied so that as the tag is fed through a heat generating printer, the desired information may be appropriately imprinted on the tag. Accordingly, such tags utilize a base material which typically includes a relatively costly plastic film or the like for providing a smooth surface and adequate strength for the baggage tag.

Of course, a wide variety of other baggage tags are known and are currently available and in use.

It would be of advantage to be able to provide a baggage tag having a heat sensitive thermally imprintable and activatable layer which is inexpensive as compared to present imprintable, coated baggage tags, but which has sufficient strength to serve as an effective baggage tag as well.

SUMMARY OF THE INVENTION

In accordance with the present invention, a thermally imprintable elongated, generally rectangular baggage tag and severable stub assembly is provided. It comprises a sheet assembly comprising a rectangular first highly calendered, dense bond paper sheet, the outer surface of the first paper sheet being generally smooth and relatively flat, a second rectangular paper sheet of the same dimensions as the first sheet, and a plurality of reinforcing fibers running longitudinally only of the lengths the first and second sheets and lying parallel to each other and being spaced apart at adjacent edges of the assembly, and desirably by distances ranging from no less than about ⅛ inch to no more than about one inch. The first and second sheets are laminated to each other by an adhesive with the fibers being sandwiched therebetween, A first transverse score line means is provided in the sheet assembly to define a baggage tag portion and a stub portion along which the stub portion may be severed from the baggage tag portion. The score line means substantially severs the reinforcing fibers.

An adhesive layer covering at least part of the lower surface of the sheet assembly is provided and a heat sensitive coating is provided on the outer surface of the first sheet for facilitating thermal imprinting of data on the outer surface of the baggage tag assembly.

In a preferred form a liner sheet is laminated to the sheet assembly via the adhesive layer and a transverse score line is provided in the liner, the liner score line being longitudinally spaced from the first transverse score line.

Preferably a first band of silicone release material is bonded to the liner adjacent the first transverse score line and a second band of silicone release material is bonded to the second sheet adjacent the liner score line, whereby, upon severance of the tag portion and the stub portion along the score lines, an exposed band of adhesive remains on the liner adjacent the stud for adherance to an object, and an exposed band of adhesive remains on the baggage tag portion for securance in another zone of the tag portion when the tag portion is to be secured thereat.

Further objects, features and advantages of the present invention will become apparent from the following description and accompanying drawings.

DESCRIPTION OF THE PRESENTLY PREFERRED EMBODIMENT

Figure 1:
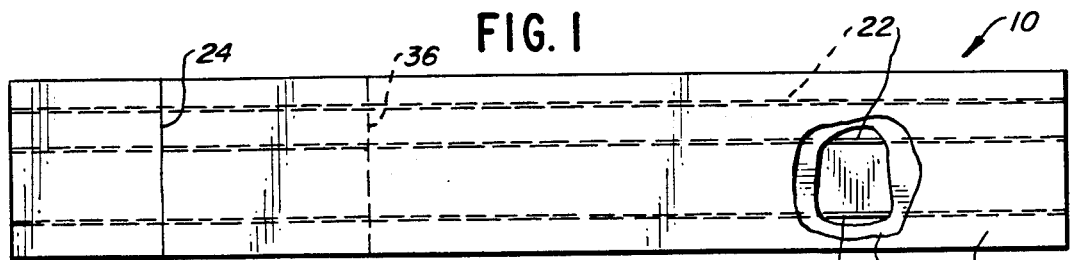
FIG. 1 is a plan view of a baggage tag assembly of the present invention.
Figure 4:
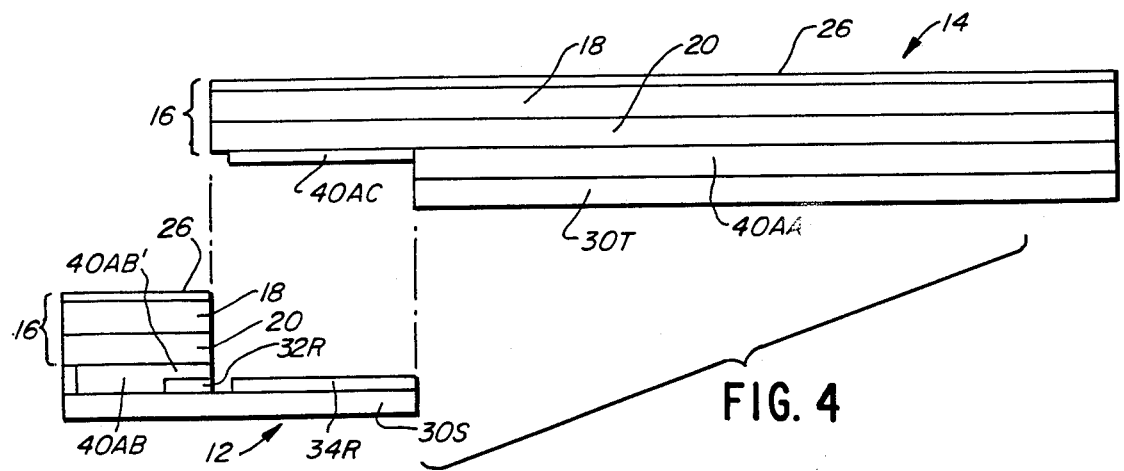
FIG. 4 is a view, similar to that of FIG. 2, but of the claim check and baggage tag portions of the baggage tag assembly of FIGS. 1-3 after they have been separated from each other.

Referring now to the drawings, a baggage tag assembly 10 in accordance with the present invention as shown in FIG. 1 is ultimately severable into a claim check or stub portion 12 and a baggage tag portion 14 (see FIG. 4).

The baggage tag assembly 10 is elongate and generally rectangular and comprises a thermally sensitive and imprintable first laminate 16. Laminate 16 comprises a heavy weight, high fiber content, highly calendered dense paper sheet 18, such as a 20 lb. bond paper, and a second, conventional inexpensive paper sheet 20, such as a kraft paper sheet. The sheets 18 and 20 sandwich between them a series of longitudinally extending, spaced apart and parallel reinforcing fibers 22. Fibers 22 run longitudinally only and may be glass fibers and may each comprise a bundle of relatively fine fibers making up a fiber 22. The fibers 22 may be spaced apart equidistantly or the distance may vary somewhat, preferably within the range of no less than about ⅛ inch and no more than about one inch, although it some situations they may be spaced apart farther, as adjacent the borders of the tags 10, as are the two outermost fibers 22 shown in FIG. 1, thereby to leave the central zone of the tag as flat as possible, where flatness of surface more than that provided by this invention is desirable. Sheets 18 and 20 which sandwich fibers 22 are laminated with a conventional adhesive in a known manner, except that the baggage tag assembly stock is manufactured in the direction of the length of the fibers, rather than transversely which is conventional, to help control and maintain the smoothness and relatively flat character of the upper outer surface of sheet 18. An exemplary sheet 18 comprising a 20 pound bond paper has a smoothness of 70 or less as measured by the Sheffield Smoothness Test. Laminate 16 also comprises a heat sensitive coating or layer 26 on its upper surface. Layer 26 is thermally imprintable in accordance with known procedures.

The stub portion and baggage tag portion 14 are distinguished, one from another, along a transverse score line means which may comprise a pair of closely parallel lines of perforations which are staggered to make certain that the fibers 22 are substantially completely severed, or which, as shown, may comprise a butt cut 24 which cuts through to the liner sheet 30 thereby to facilitate separation of the stub portion 12 and baggage tag portion 14 along the butt cut 24 when the baggage tag is to be used.

The baggage tag further desirably includes a liner sheet 30 which is appropriately adhesively secured to the stub portion 12 and baggage tag portion 14.

Figure 2:
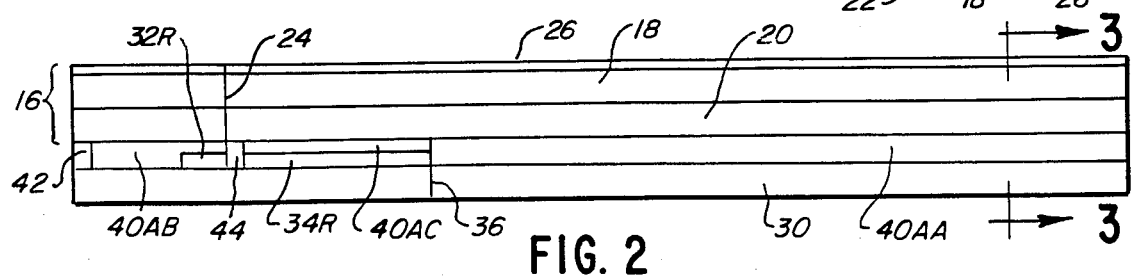
FIG. 2 is a side elevational view of the baggage tag of FIG. 1, and which is exaggerated in vertical dimension for ease of understanding.

As best seen in FIGS. 2 and 4, the liner sheet 30 (as of paper) is secured to the laminate 16 via a layer of adhesive 40, comprising adhesive layer portion 40AA lying along the main body of the tag portion 14, adhesive layer portion 40AB in the zone of the stub portion 12 and a further layer portion 40AC also lying along a portion of the tag portion 14. As is noted adhesive is absent from the end of the stub and adjacent the butt cut 24, as represented by non-adhesive zones 42 and 44. It should also be noted that a further score line, such as butt cut line 36 is provided. This cuts through the liner sheet 30 to the laminate 16.

In addition to the adhesive, release material, such as silicone release material is disposed in selected zones adjacent to the butt cuts 24 and 36. Thus, a release band 32R is provided in the stub zone and a release band 34R is provided in the tag zone. Release bands 32R, 34R are bonded to the liner sheet.

As stated, the adhesive layer 40 (40AA, 40AB, 40AC) is provided intermediate the liner sheet 30 and the baggage tag laminate 16. Adhesive layer 40 adheres both to the baggage tag assembly and liner in a relatively permanent fashion except in the zones of release bands 32R and 34R. Most preferably the adhesive layer 40 is a pressure sensitive adhesive so that when it is exposed for use, it will adhere to an object to which it desirably should be attached.

In that regard, as best seen in FIG. 4, when the claim check portion 12 is separated from the baggage tag portion 14, along butt cuts 24 and 36, the liner portions 30S and 30T remain associated, respectively, with the stub 12 and the baggage tag 14. Thus, the band of adhesive 40AB remains secured to stub portion 12 and may ultimately be used for adhering the claim check 12 to an object such as to a ticket wallet or the like, as by removing part of the liner to expose adhesive layer portion 40AB' for adhesive securance to a ticket wallet. The exposed body or band of adhesive 40AC remains with the baggage tag portion 14, having released from the silcone release layer 32R, and thereby provides a means for adherance of the end of the tag adjacent the butt cut 24 to the other end of the tag, as when it is formed into a loop about the handle of a piece of luggage or the like.

After the laminate 16 has been formed, and preferably before the liner sheet 30 has been added, the upper surface 28 of the laminate is provided with a heat sensitive material to provide the thermally sensitive layer 26. A variety of heat sensitive coating materials are known and available and one such is Appleton's Thermal Coating No. T1022A. Layer 26 may be over-printed at an appropriate time with selected printed materials, such as the name of the airline, its logo, etc., i.e., constant data. Thereafter, the baggage tag assembly may be completed as was described above.

The completed baggage tag may be provided to a mass user customer for dispensing from a known device which may be used to "customize" the baggage tag and claim check or stub, i.e., to imprint data, such as data unique to the particular flight, customer, date, or the like, in a known manner, for dispensing from the device, and then for issuance by the baggage handler, of the claim check to the passenger and securance of the baggage tag portion to the luggage. It will be apparent that the arrangement of the layers of the baggage tag assembly 10 as described is such that most of the paper liner portions remain with portions 12, 14, reducing to a minimum disposable liner portions which would be dropped and which would clutter the area. Indeed, if the liner portion remaining within the stub is folded back to expose adhesive section 40AB, then it is not necessary to leave any disposable portion to clutter the area of use.

It is has been determined that the baggage tag assembly described, despite the fact that it utilizes paper without plastic films, such as expensive polyester films and the like, has adequate and sufficient strength to serve as a baggage tag, while having surface characteristics which are sufficiently smooth to enable localized heat activated imprinting of the heat sensitive layer 26 clearly to provide the discreet "customized" data required for use of a baggage tag of this type.

The baggage tags described may be made in accordance with the following process.

A high fiber, highly calendered dense paper of at least 18 pound weight, such as a 20 pound bond paper, a typical suitable such paper being James River 20 pound bond paper having a caliper of 0.029 mill, is adhesively assembled with a second sheet and longitudinally fibers by a known reinforced tape making process. However, the formation of the stock is made in the direction of the fibers, rather than transversely as is conventional. The fibers used are multistrand glass fibers, in the aggregate typically being of about a 1/32 inch diameter, in bundles of about 750 fibers and are positioned to extend longitudinally and parallel to each other only. The fibers are spaced apart a distance of from no less than about ⅛ inch to no more than about ½ inch.

The highly calendered surface is smooth and has the characteristics of a film instead of the characteristics of the paper routinely used for fiber reinforced tapes.

At this point the tape is continuous, as in roll form. The paper tape is then coated on the smooth, calendered side with a thermally sensitive coating, such as previously described, i.e., one which when heated locally with variable identifying information will imprint that information and make it visible without otherwise conventionally imprinting the surface. Of course the tape may also be precoated or preprinted (or postprinted or post-coated) locally with inks to provide constant data, such as the name or logo or the like of the airline which will be using the baggage tags.

If the forms have not previously been printed with constant data, they are printed on their front sides (the heat sensitized surface) with the constant data, such as in a multicolor design and in suitable patterns.

The blank forms are then coated with an adhesive, such as a hot melt adhesive which forms a pressure sensitive coating layer, over their entire back surface. A matching liner web is locally spot coated with a silcone release coating to provide the silicone release bands.

The release liner web and baggage tag blank forms are then joined to register appropriately, with the liner facing the pressure sensitive adhesive to form a liner-baggage tab assembly laminate. The adhesive permanently bonds the baggage tag form and liner web to each other except in the zones of the silicone release coating where they are temporarily bonded.

At this point the paper tape as suitably coated and/or printed is ready for conversion into useable baggage tags. While still in roll form, or otherwise in a continuous multi baggage tag blank form, or in a single width continuous multi-tag blank form, the back of the tape is locally spot coated with the adhesive coating to provide the bands referred to above. Where desired the back of the tape may be barrier coated to prevent absorption of the adhesive materials to be applied. Barrier coats to improve humidity resistance may also be used.

At the same time, or at some convenient later time, the baggage tag blanks are provided with a line or lines of serration, such as the butt cut, at the zone where a claim check stub and baggage tag will be severed. The lines of serration are provided so that the fibers will be sufficiently cut or weakened to easily tear thereat when the stub is to be removed, and therefore staggered closely parallel lines of serrations are preferably used to score the laminate is a butt cut is not used.

At this point the baggage tag forms are complete. If they are in multiwidth form, they may be cut into single width continuous lengths of longitudinally joined baggage tag forms to be coiled for use in roll form for processing and dispensing at a point of use (as from an appropriate device at an airline baggage receiving facility or the like), or may be otherwise severed and collated for similar use and dispensing at a point of use.

Figure 5:
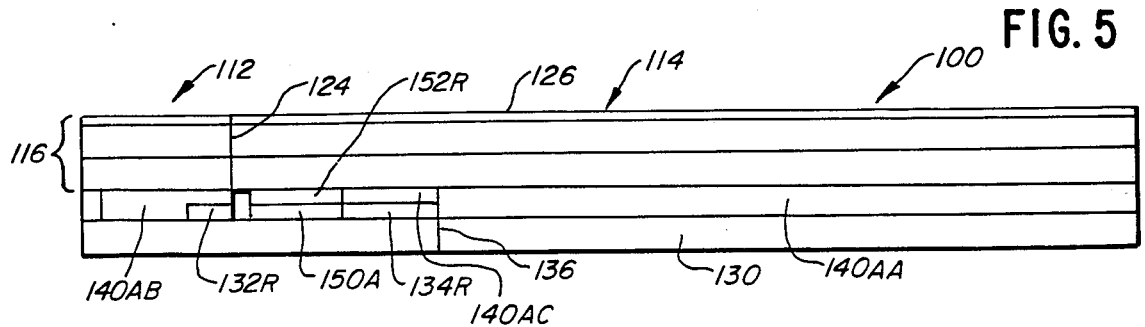
FIG. 5 is a plan view of a further embodiment of a baggage tag assembly of the present invention.

A baggage tag which is entirely wasteless may also be made in accordance with the present invention as may be seen from FIG. 5. FIG. 5 differs from FIG. 2 in but one respect, i.e., in the arrangement and disposition of the silicone release bands and adhesive at one end of the baggage tag portion.

Thus the baggage tag assembly 100 comprises a stub portion 112 and a baggage tag portion 114. They comprise a laminate 116 which may be constructed and constituted as is laminate 16, including having a heat sensitive layer 126 and score lines such as lines of perforation or butt cut score lines 124 and 136 cutting through to the same locations as butt cuts 24 and 26. A liner sheet 130 is provided.

The liner sheet is secured to the stub portion 112 by an adhesive body 140AB. The liner sheet is secured to the baggage tag portion by an adhesive body 140AA. A release material zone 132R may be present, although it is not required.

Figure 3:
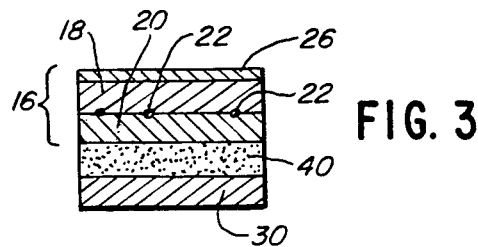
FIG. 3 is a cross-sectional view taken substantially along 3—3 of FIG. 2.

In the zone of the baggage tag assembly between the butt cuts 124 and 136, however, the arrangement of adhesive and release material is different from that of the embodiment of FIGS. 1 to 4. Thus, there remains a portion of the adhesive body and release material as shown in FIGS. 2–4, but adhesive body 140AC and release band 134R extend only about one-half the width of the space between cuts 124 and 136, and that adjacent the butt cut 136. The remainder of the width of the space provides an adhesive body 150A secured to the liner sheet 130 and a release band 152R adhered to the laminate 116. As such, it will be appreciated that when the stub and tag portions are separated, the tag portion will have an exposed body of adhesive 140AC for use in providing an encircling tag portion as described above, and the liner will have a readily exposed body of adhesive 150A (the release band 152R remaining with the tag) for securance of the stub 112 to a ticket wallet or the like. Thus removal of any part of the tag assembly is unnecessary (the tag assembly is wasteless), and both the tag and the stub provide self-adhering characteristics for use at the time they are used and issued.

While a preferred embodiment of the invention has been illustrated and described herein, it will be appreciated that changes and variations may be made by those skilled in the art without departing from the spirit and scope of the invention. The invention is defined by the following claims.

What is claimed is:

1. A thermally imprintable elongated, generally rectangular baggage tag and severable stub assembly comprising:
   a sheet assembly having an outer surface and an opposite lower surface, and comprising a rectangular first highly calendered, dense bond paper sheet defining said outer surface, said outer surface of the first paper sheet being generally smooth and relatively flat, a second rectangular paper sheet of the same dimensions as the first sheet, a plurality of reinforcing fibers running longitudinally only of the lengths of said first and second sheets and lying parallel to each other, said first and second sheets being laminated to each other by an adhesive with said fibers being sandwiched therebetween,
   a first transverse score line in said sheet assembly to define a baggage tag portion and a stub portion along which said stub portion may be severed from said baggage tag portion, said score line substantially severing said reinforced fibers,
   an adhesive layer covering at least part of the lower surface of said sheet assembly,
   and a heat sensitive coating on the outer surface of said first sheet for facilitating thermal imprinting of data on the outer surface of said baggage tag assembly.

2. The assembly of claim 1 and wherein said fibers are spaced apart by distances ranging from no less than about ⅛ inch to no more than about one inch.

3. The assembly of claim 1, and wherein said first sheet is at least an 18 pound bond paper.

4. The assembly of claim 1, and further comprising a liner sheet laminated to said sheet assembly via said adhesive layer.

5. The assembly of claim 4, and wherein a transverse score line is provided in said liner, said liner score line being longitudinally spaced from said first transverse score line.

6. The assembly of claim 5, and wherein a first band of silicone release material is bonded to said liner adjacent said first transverse score line and a second band of silicone release material is bonded to said second sheet adjacent said liner score line, whereby, upon severance of said tag portion and said stub portion along said score lines, an exposed band of adhesive remains on said liner adjacent said stud for adherance to an object, and an exposed band of adhesive remains on said baggage tag portion for securance in another zone of said tag portion when the tag portion is to be secured thereat.

* * * * *

UNITED STATES PATENT AND TRADEMARK OFFICE
CERTIFICATE OF CORRECTION

PATENT NO. : 4,817,310
DATED      : April 4, 1989
INVENTOR(S): Thomas J. Breen and Stephen H. King It is certified that error appears in the above-identified patent and that said Letters Patent is hereby corrected as shown below:

Column 2, line 9, change the comma to a period;
Column 2, line 32, substitute --stub-- for "stud";
Column 3, line 9, substitute --in-- for "it";
Column 4, line 13, silicone is misspelled;
Column 4, line 46, delete the word "is";
Column 5, line 24, silicone is misspelled; and
Column 5, line 51, substitute --if-- for "is".

Column 8, line 7, substitute --stub-- for "stud".

Signed and Sealed this

Twentieth Day of March, 1990

Attest:

JEFFREY M. SAMUELS

*Attesting Officer*      *Acting Commissioner of Patents and Trademarks*